United States Patent [19]

Fuyama et al.

[11] 3,727,010

[45] Apr. 10, 1973

[54] AUTOMATIC CARD DIALING DEVICE USING PHOTOCELL READOUT

[75] Inventors: Hiroshi Fuyama, Kawasaki; Osamu Iida, Kanagawa, both of Japan

[73] Assignee: Nippon Communication Industrial Company, Limited, Kanagawa-ken, Japan

[22] Filed: Feb. 26, 1971

[21] Appl. No.: 119,343

[30] Foreign Application Priority Data

Sept. 24, 1969 Japan ........................44/90095

Related U.S. Application Data

[63] Continuation of Ser. No. 74,449, Sept. 22, 1970, abandoned.

[52] U.S. Cl. ..........................................179/90 CS

[51] Int. Cl. ..........................................H04m 1/48

[58] Field of Search ..............................179/90 CS; 235/61.11 E; 250/219 D, 250/219 DC

[56] References Cited

UNITED STATES PATENTS

| | | | |
|---|---|---|---|
| 3,592,972 | 7/1971 | Lane | 179/90 CS |
| 3,274,345 | 9/1966 | Ham et al. | 179/90 CS |
| 3,286,040 | 11/1966 | Andregg | 179/90 CS |

*Primary Examiner*—Kathleen H. Claffy
*Assistant Examiner*—Thomas D'Amico
*Attorney*—Kurt Kelman

[57] ABSTRACT

An optically sensed automatic telephone dialer adaptable for use with either multi-frequency or dial pulse signalling. The dialer includes means for controlling the rate at which the record card is ejected and an electromagnet for intermittently arresting the ejection of the card, as successive digits in the stored number are sensed.

1 Claim, 8 Drawing Figures

INVENTORS.
HIROSHI FUYAMA &
OSAMU IIDA
BY Kurt Kelman
AGENT

INVENTORS.
HIROSHI FUYAMA &
OSAMU IIDA
BY
Kurt Kelman
AGENT

INVENTORS.
HIROSHI FUYAMA &
OSAMU IIDA

BY Kurt Kelman

AGENT

AUTOMATIC CARD DIALING DEVICE USING PHOTOCELL READOUT

This is a continuation of our copending application Ser. No. 74,449, filed Sept. 22, 1970 now abandoned.

This invention relates to an automatic dialing device. More particularly, in a preferred embodiment, the invention relates to an optically sensed automatic dialing device adaptable for use with either multi-frequency or conventional dial signals.

Automatic dialing devices employing punched cards are well known in the art. Typically, in such devices the desired telephone number is recorded on the card by a coded pattern of apertures which are mechanically sensed by pins or the like, as the card is moved past the pins. Unfortunately, because of the mechanical nature of the sensing pins, reliable and accurate dialing has not been attained. Furthermore, in prior art devices of this type, the card is moved through the sensing region by means of an electrically or mechanically rotated gear which engages with a row of apertures provided for that purpose along one or more edges of the card. This arrangement has also proved to be somewhat unsatisfactory, in practice, as it is extremely difficult to obtain a constant rate of card advancement, which is, of course, essential for proper operation of the central office switching equipment.

In such prior art devices it is, of course, necessary to arrest the motion of the card intermittently so that each digit of the number recorded thereon can be sensed and transmitted, at the appropriate time, to the telephone line. Heretofore, the motion of the card has been arrested by inserting a small pin into one of the apertures which engage the teeth of the driving gear. This pin may be inserted mechanically, or by means of an electromagnet. Alternatively, the motion of the card is arrested by intermittently terminating the power transmitted to the driving gear.

In connection with the former, card-arresting technique, it is clear that the apertures in the card which represent the recorded number must be carefully aligned with the card driving apertures. This is difficult to do and greatly increases the cost of manufacturing each card. In connection with the latter technique, only cards which have a predetermined pitch of the rows of number apertures can be used, limiting the versatility of the device.

Accordingly, it is an object of the present invention to provide an automatic telephone dialing apparatus having a read-out device which is simple in structure, yet stable and reliable in operation.

It is a further object of this invention to provide an automatic telephone dialing apparatus which does not employ mechanical sensing of the coded apertures in the record card and which advances the card at a uniform rate.

With these and other objects in mind, a preferred embodiment of the invention comprises an automatic telephone dialing device of the type that includes sensing means for sensing a telephone number stored by means of rows of coded apertures in a record card. The dialing device includes means for advancing the record card past the sensing means at a constant velocity, and a signal generator for generating dial signals in accordance with the information sensed by the sensing means.

The dialing device further comprises a plurality of photoelectric elements perpendicularly disposed with respect to the direction of record card travel, one photoelectric element being provided for each bit position in the rows of coded apertures in the card. The device further includes a light source positioned so as to direct light through the coded apertures in the record card onto the plurality of photoelectric elements, the photoelectric elements generating signals representative of the digits stored in the rows of apertures in the card, as selected ones of the elements are energized by the light which succeeds in passing through the corresponding apertures in the rows of apertures.

Figure 6:
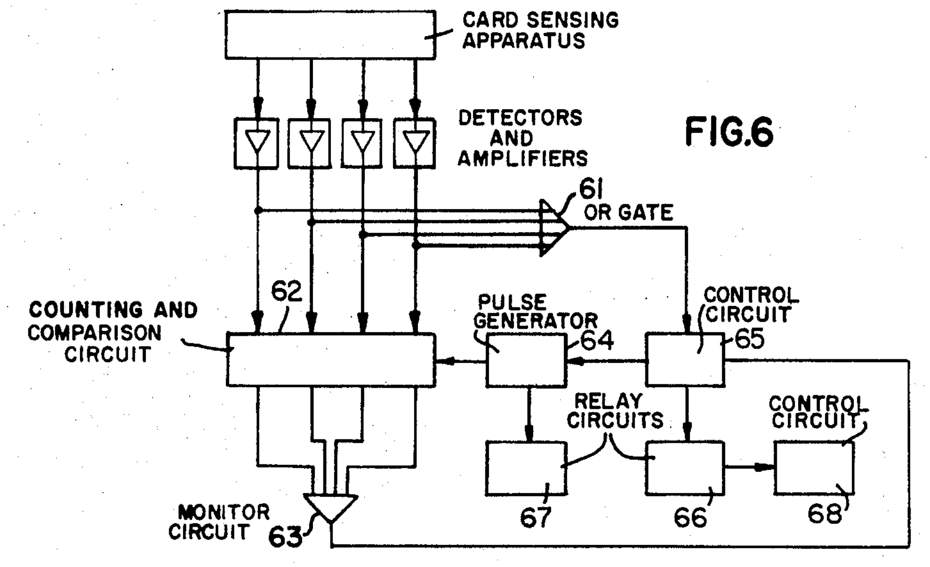

FIGS. 5(*a*) and 5(*b*) depict the waveforms present in the apparatus of FIGS. 1–4 for multi-frequency and dial pulses, respectively;

FIG. 6 is a block diagram of another embodiment of the invention; and

Figure 1:
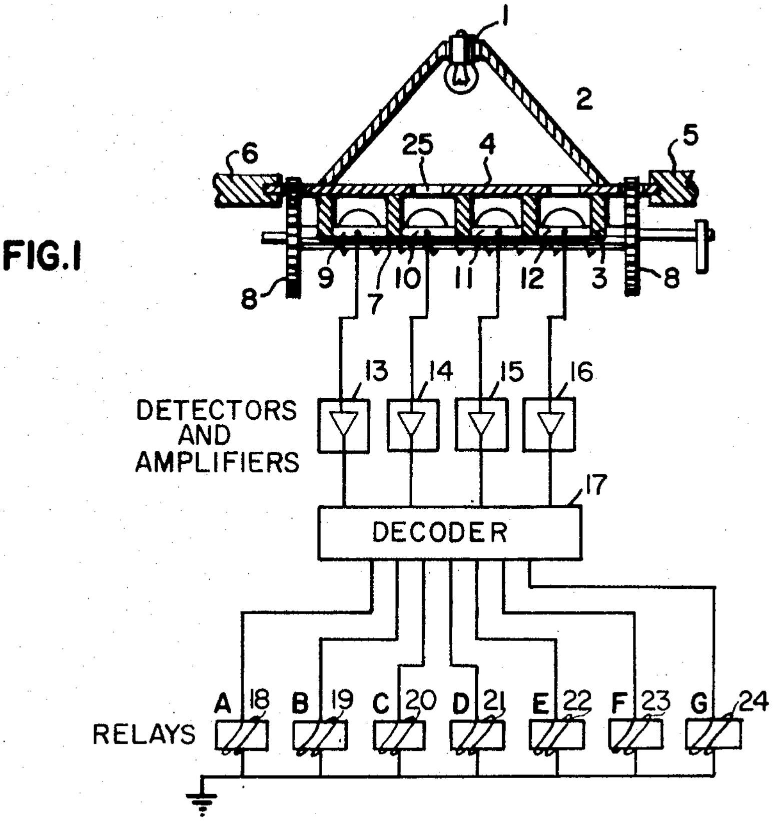
FIG. 1 is a partial, cross-sectional view of an illustrative embodiment of the invention.
Figure 7:
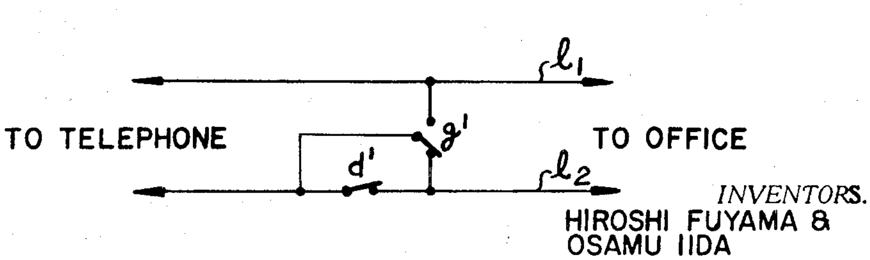

FIG. 7 illustrates the schematic diagram of a dial pulse generator for use with the apparatus of FIG. 1.

Referring to FIG. 1, an automatic telephone dialing device is shown to have lamp 1 and a reflector 2 for directing light energy from the lamp onto a plurality of photoelectric elements 9–12 positioned in, and retained by, a corresponding plurality of apertures in a retaining member 3 positioned proximate lamp 1 and reflector 2. Photoelectric elements 9–12 may comprise, for example, photoelectric cells, photo-transistors and the like.

A record card 4, which will be described in more detail below, is slidably held intermediate lamp 1 and retaining member 3 by first and second guide rails 5 and 6, respectively. The automatic dialing device further includes a card advancing mechanism comprising a rotatable shaft 7 to which a feeding gear 8 is attached by conventional means.

A plurality of signal detecting and amplifying circuits 13–16 are connected, on a one-to-one basis, to the outputs of photoelectric elements 9–12. A decoding circuit 17 is connected to each of the signal detecting and amplifying circuits and is itself connected to a plurality of control relays 18–24 in an address signal-generating circuit.

The embodiment of the invention above-described is intended for use with a multi-frequency dialing system, of the 2 out of 7 type, in which each digit of the desired telephone number is transmitted by selecting two different pairs of frequencies out of a total number of 7 separate frequencies. Thus, as shown in FIG. 1, there are seven control relays, three of which control contacts affecting selection of multi-frequency tones in the high frequency group and 4 of which control contacts affecting the selection of multi-frequency tones in the low frequency group.

Figure 3:
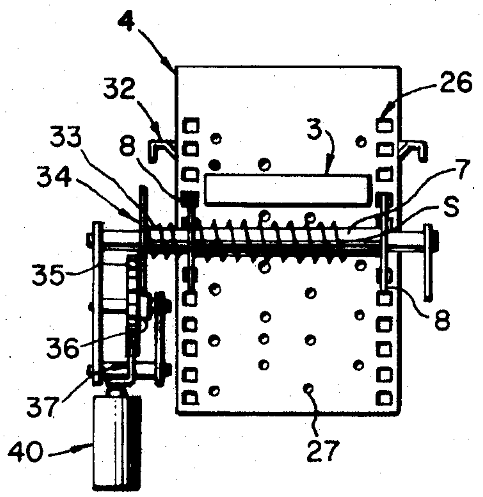
FIG. 3 is an illustrative card advancing and card arresting mechanism, for use with the apparatus shown in FIG. 1.

As shown more clearly in FIG. 3, each record card 4 comprises two rows of driving apertures 26, advantageously located at the edges of the card. The desired telephone number is recorded by punching a plurality of code apertures 27 in the card in the area thereof bounded by the rows of driving apertures. Each digit of the desired telephone number is represented by a row of apertures 27 orthogonally oriented with respect to the driving apertures 26.

If the telephone number is to be recorded in a binary code, card 4 must be sufficiently wide to accommodate four apertures in each code row ( 1 =0001, 2 =0010 . . . 10 = 1010). Use of a 2 out of 5 code would require five apertures in each row and, in the case of multi-frequency signaling with a 2 out of 7 code, seven apertures would be required. In this latter event, decoder 17 may be omitted and each of relays 18–24 can be directly connected to and controlled by the output of the corresponding signal detecting and amplifying circuit.

In FIG. 1 only four photoelectric devices and four signal detecting and amplifying circuits are shown but it will be apparent that additional units can be added, as required, for a 2 out of 5, or a 2 out of 7 code scheme. With this latter arrangement, three signal detecting circuits would be associated with the high frequency multi-frequency tones and four with the low frequency tones.

In the illustrative embodiment of the invention to be described below, the use of a binary code is assumed. Thus, in FIG. 3, record card 4 is shown as including four regions in which information bearing apertures are located.

Referring to FIG. 1, when record card 4, having the desired telephone number stored therein, is advanced through the automatic dialing device by the card advancing mechanism, to be described below, the card advances along a path defined by guide rails 5 and 6. When a row of code apertures 27, corresponding to a digit in the desired telephone number, is advanced so that it is intermediate lamp 1 and photoelectric elements 9 through 12, the photoelectric elements corresponding to the apertures 27 in the row, receive light from lamp 1 and are energized, thereby producing output signals. In FIG. 1, photoelectric elements 10 and 12 are depicted as receiving light rays from lamp 1. The output signals from the photoelectric elements are reshaped and amplified by the corresponding signal detecting and amplifying circuits (14 and 16; FIG. 1) and are then applied to decoder 17 and input signals therefor. The other photoelectric elements, which do not receive illumination from lamp 1 (i.e., 9 and 11; FIG. 1), do not produce output signals and the corresponding signal detecting an amplifying circuits (13 and 15; FIG. 1) generate no input signals for decoder 17. As a result, a binary signal (1001 — FIG. 1) is applied to decoder 17. This binary signal represents the number "5" in the decimal system.

In telephone systems which employ multi-frequency signaling, the subscriber's instrument typically includes a multi-frequency code signal generator which includes three sets of contacts for the high frequency group of tones and four sets of contacts for the low frequency group of tones. Thus, a multi-frequency code signal, which corresponds to a desired decimal digit may be selected by making an appropriate cross-connection between one of the three high frequency contacts and one of the four low frequency contacts.

Figure 2:
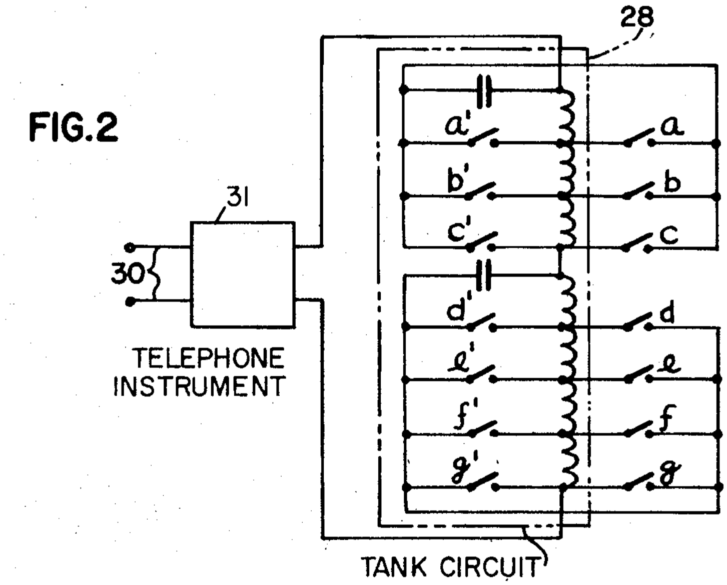
FIG. 2 is a schematic illustration of a multi-frequency generator suitable for use with the apparatus shown in FIG. 1.

FIG. 2 illustrates a typical multi-frequency code generator for use with a subscriber's instrument. In FIG. 2, the telephone instrument 31 is connected to a two-wire transmission line 30 and to a tank circuit 28 which forms a part of the multi-frequency generator associated with the subscriber instrument 31. Instrument 31 includes seven switch contacts (A′ – G′) operated by push buttons (not shown), typically located on the face of the telephone instrument. In accordance with the invention, seven additional switch contacts (A – G) are provided in parallel with the seven contacts (A′ – G′) normally provided for manual operation by the subscriber. The switch contacts A – G are controlled by a corresponding plurality of relays 18 – 24, as shown in FIG. 1. Thus, in the circuit shown in FIG. 2, when the subscriber pushes the button which corresponds to the digit 5, for example, a pair of switch contacts, for example, A′ and F′, are closed and the combination of inductance and capacitance thus selected will cause the multi-frequency generator to generate the appropriate tone which is then applied over line 30 to multi-frequency detecting circuitry at the telephone central office (not shown). In the embodiment of the invention shown in FIGS. 1 and 2, the desired multi-frequency tones may be generated by operation of the appropriate relays in the group of relays 18 – 24 which close, in turn, the corresponding auxiliary contacts A – G, thereby automatically generating the desired multi-frequency signal without the necessity for manual intervention by the subscriber.

Returning now to FIG. 1, after decoder 17 receives a binary signal, such as "0101," from photoelectric elements 10 and 12 and signal detectors 14 and 16, for example, decoder 17 will operate the corresponding relays, for example the A relay 18 and the F relay 23. This, in turn, will operate the corresponding relay contacts A, F, generating the multi-frequency code corresponding to the decimal digit 5. The decoding circuitry necessary to operate the appropriate relays may comprise, for example, a diode matrix or other similar circuit, the design of which is known to one skilled in the art and which, therefore, is not described in detail.

As data record card 4 advances, multi-frequency signals corresponding to each digit stored in the card are sequentially transmitted over telephone line 30 until the multi-frequency signal corresponding to the last digit in the telephone number has been transmitted.

Figure 4:
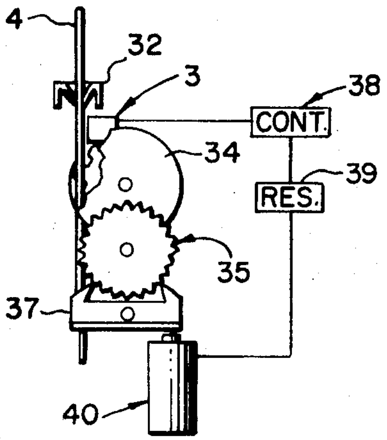
FIG. 4 is a side view of the apparatus shown in FIG. 3.

FIG. 3 shows the card advancing mechanism in greater detail. FIG. 4 shows the mechanism by which motion of the card is arrested so that each digit of the telephone number recorded thereon may be properly read and transmitted over the telephone line. As shown, the card advancing mechanism includes a mouth 32 in which record card 4 is inserted, as well as a rotating shaft 7 which is oriented perpendicularly to the direction in which the card is advanced. Shaft 7 carries a toothed driving gear 8 at each end. Toothed driving gears 8 engage with the driving apertures 26 located along the edges of the record card. Manifestly, the number of driving gears 8 will vary as the number of rows of driving apertures 26 in card 4 varies. The advancing mechanism further includes a coil spring S, one end of which is secured to rotating shaft 7, the other end of which is secured to some fixed part of the housing for the card reader and which is omitted from the drawing for simplification. Spring S provides the energy by which shaft 7 is rotated and card 4 advanced. A unidirectional clutch 33 is provided to transmit the rotation of shaft 7 to gear 34, as shown more clearly in FIG. 4. Gear 34 is associated with an escapement wheel 35 and a pinion 36 which engages with gear 34 and has a common shaft with escapement wheel 35, so that pinion 36 and escapement wheel 35 are simultaneously rotated by gear 34. An anchor 37 is connected to escapement wheel 35 to form an anchor escapement mechanism. The retaining member 3, which retains the plurality of photoelectric elements 9 – 12, is positioned adjacent rotating shaft 7 on the far side of card 4 from light source 1. A control circuit 38 is connected to the photoelectric elements and controls an electromagnet 40 via a reset button 39. Reset button 39, when activated, breaks the circuit from relay 40 to control circuit 38. When activated, electromagnet 40 attracts anchor 37, thereby stopping rotation of escapement wheel 35 so that the advancement of card 4 through the automatic dialer may be arrested during the interval when it is desired to read a stored digit from the card.

When a card is inserted through mouth 32 into the device, the driving apertures 26 engage with driving gears 8 so that spring S is twisted, by rotation of shaft 7, storing up energy therein. The rotation of shaft 7 is not transmitted to gear 34 because of the action of unidirectional clutch 33 when a card is released. However, after it reaches some predetermined limit of travel, shaft 7 and driving gears 8 are rotated by the release force of spring S so that card 4 is ejected from the card reader through mouth 32. In this later situation, the rotation of shaft 7 and gears 8 is transmitted to gear 34, through unidirectional clutch 33, thence to escapement wheel 35 through pinion 36. Escapement wheel 35 is controlled by anchor 37 so that the speed of rotation of escapement wheel 35 is held constant. As a result, the speed at which the card is ejected from the reader is also maintained constant. When card 4 is advanced to the position where a row of apertures 27 corresponding to a digit are aligned with the photoelectric elements in retaining member 3, output signals will be obtained from some of the photoelectric elements, as described in connection with FIG. 1. The output signals are applied to control circuit 38 to energize electromagnet 40 to arrest further motion of card 4, as above described.

While further advance of card 4 is arrested, the signals representing the digit corresponding to the row of apertures which is positioned proximate the photoelectric elements are transmitted over telephone line 30, as previously described. After the signals corresponding to a particular digit are transmitted, control circuit 38 operates to de-energize electromagnet 40. With electromagnet 40 de-energized, escapement wheel 35 rotates at a constant velocity, as determined by anchor 37. Thus, record card 4 is again advanced in the same direction as it was previously advanced. When the apertures corresponding to the second digit in the desired telephone number are aligned with the photoelectric elements, the card is again stopped, and signals representative of the second digit are transmitted to telephone line 30 in the same manner as previously described. This procedure is reiterated until the signals corresponding to the last digit in the telephone number are transmitted to line 30.

When it is desired to replace a card which has already been placed into the automatic dialing device with another card, for example, if the wrong card has been accidentally inserted therein, reset button 30 may be operated to release electromagnet 40 from the control of circuit 38. This permits the erroneously inserted card to be removed readily from the dialing device without any intermittent stops. Thus, no signals corresponding to the telephone number stored on the erroneously inserted card will be transmitted to the line.

In the above described embodiment of the invention, coil spring S is twisted by the operation of inserting a record card through mouth 32 into the automatic dialing device. One skilled in the art, however, will appreciate that other means may be provided for twisting spring S about the rotating shaft; for example, a manually operated lever. In this latter instance, the card may advantageously be formed of a flexible material, such as thick cardboard and the like.

Figure 5A:
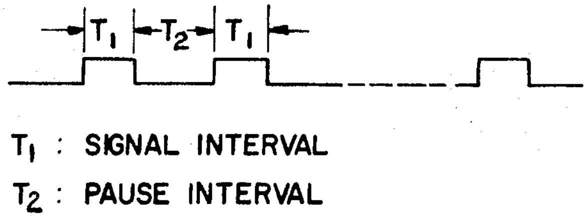

FIG. 5*a* depicts the wave forms present in the circuit according to this invention when multi-frequency signaling is employed. $T_1$ represents the interval during which signals are transmitted to the line and $T_2$ represents the interval between one signal and the succeeding signal. In this instance, the pitch of the code apertures corresponding to the desired digits on a record card may be suitably selected so that the multi-frequency signals corresponding to each digit may be transmitted to telephone line 30 without the necessity of intermittently arresting motion of the card. This can be readily accomplished by merely omitting the card arresting mechanism previously discussed.

When the embodiment of the invention is for use with conventional dial signals, as illustrated in FIG. 6, R represents the card sensing apparatus and includes the card advancing means and card arresting means illustrated in FIGS. 3 and 4. Signal detecting and amplifying circuits 13 – 16, which are essentially identical to the units shown in FIG. 1, connect the photoelectric detectors in sensing means R to the inputs of a counter circuit 62 which is provided for temporarily storing and counting the outputs from signal detecting and amplifying circuits 13 – 16. The outputs from signal detecting and amplifying circuits 13 – 16 are also connected to the inputs of an Or-gate 61. The output of Or-gate 61 is, in turn, connected to the input of a control circuit 65 which is connected to, and controls, the operation of a square wave generating circuit 64. A monitoring circuit 63 is connected to the output of counter circuit 62 to detect the information stored therein. The output of monitoring circuit 63 is also connected to an input of control circuit 65. A first relay circuit 66 is connected to an output of control circuit 65 and has a first contact G′, as shown in FIG. 7. A second relay circuit 67 is connected to the output of square-wave generating circuit 64 and has a first contact D′ in the telephone circuit, as shown in FIG. 7, for generating dial pulses which are transmitted to the telephone central office. A control circuit 68 is connected to contacts associated with first relay circuit 66 and, in turn, controls electromagnet 40, shown in FIGS. 3 and 4.

The telephone number stored in a card is read out by sensing circuit R in the same manner as previously described in connection with the multi-frequency embodiment illustrated in FIGS. 1 through 4. The signals corresponding to the telephone number generated by the photoelectric elements in sensing means R are detected and amplified by the appropriate ones of signal detecting and amplifying circuits 13 – 16 and are temporarily stored in counter circuit 62. The outputs from signal detecting and amplifying circuits 13 – 16 are also applied to control circuit 65, through Or-gate 61, so that control circuit 65 will be actuated to energize pulse circuit 64 and first relay circuit 66 simultaneously when at least one aperture is sensed in the record card. The output from pulse generating circuit 64 starts a count in counter 62. At the same time, the output pulses from pulse generating circuit 64 also energizes the second relay circuit 67, causing associated relay contacts D′ to open and close, thereby applying dial impulses to telephone line 30. First relay circuit 66 is also actuated by control circuit 65, operating, in turn, control circuit 68 to actuate electromagnet 40.

Assume now that the output signals from sensing means R correspond to the previously described situation where the data record is storing the numerical digit 5 in binary form. In this condition, the first and third photoelectric elements will be energized and signal detecting and amplifying circuit 13 and 15, for example, will generate output signals which will be applied to control circuit 65 via Or-gate 61, and also to counter circuit 62. Control circuit 65, when actuated, energizes pulse generating circuit 64 so that a pulse train is applied to counter circuit 62. After five pulses have been applied to counter circuit 62, counter circuit 62 will generate an output signal which will be applied to monitoring circuit 63. The output from monitoring circuit 63 is then applied to control circuit 65, whereby further generation of pulses from pulse generating circuit 64 is stopped. The five pulses transmitted from pulse generating circuit 64 are, of course, applied to second relay circuit 67 so that relay contact D′ (FIG. 7) opens and closes five times in succession. During the period during which these five pulses are being generated, first relay circuit 66 is also energized so that relay contact G′ (FIG. 7) connects telephone line $L_1$ and $L_2$ so that the dial pulses generated by the operation of relay contact D′ are sent to the central office via lines $L_1$ and $L_2$. Control circuit 68 is also actuated by first relay circuit 66 during the operation time thereof, so that electromagnet 40 is energized and the further advancement of record card 4 arrested. First relay circuit 66 is reset at the time that the output signal from monitoring signal 63 is applied to control circuit 65. Thus, after the five dial pulses have been transmitted to the line control circuit 68, electromagnet 40 is reset and card 4 advances for reading out the next stored digit in the desired telephone number.

Figure 5B:
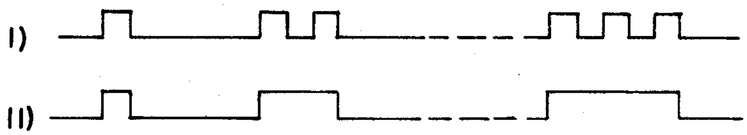

When conventional dial pulse signaling is employed, the signal intervals corresponding to the digits 0, 1, 2, . . . 9 differ from each other but the minimum pause between the last pulse of a digit and the first pulse of a succeeding digit remains the same, as shown in FIG. 5B. Thus, the card advancing and arresting mechanisms may advantageously be used for providing the desired pulse intervals. It will be noted that the pulse signal interval may be established as desired by varying the distance between adjacent digit apertures on the card, bearing in mind the velocity at which the card is ejected from the reader and the minimum pause interval thereby generated without use of any card arresting mechanism so as to obviate the necessity of using an unduly long record card.

On the other hand, inter-digit intervals can be obtained by varying the space on the card between adjacent digits, bearing in mind the velocity of card advancement, since the minimum inter-digit interval is constant, regardless of the digits being transmitted.

FIG. 5B illustrates the wave forms generated in this embodiment of the invention. Wave form (i) illustrates the dial pulse signals corresponding to the digits "1", "2", - - - , "3", - - - and wave form (ii) illustrates the corresponding condition of first relay circuit 66 or of the contact G′.

One skilled in the art may make various changes and modifications to the two illustrative embodiments of the invention above described without departing from the spirit and scope of the invention. We claim:

1. In an automatic telephone dialing device of the type that includes sensing means for sensing a telephone number stored by means of rows of coded apertures in a record card, said card including at least one row of driving apertures disposed towards the edge of said card, said dialing device including means for advancing said card past said sensing means at a constant velocity, and a signal generator for generating dial signals in accordance with the information sensed by said sensing means, the improvement which comprises:

1. a plurality of photoelectric elements for said sensing means, said photoelectric elements being perpendicularly disposed with respect to the direction of record card travel, one photoelectric element being provided for each bit position in the rows of coded apertures in said card; and
2. at least one light source positioned so as to direct light through said coded apertures onto said plurality of photoelectric elements, said photoelectric elements generating signals representative of the digits stored in the rows of apertures in said card, as selected ones of said elements are energized by the light which passes through the corresponding apertures in said rows of apertures, and for telephone systems which employ dial pulse signaling, said signal generator includes:

a pulse generator;

a counting circuit connected to the outputs of said photoelectric elements and to the output of said pulse generator, the outputs of said photoelectric elements loading said counting circuit with a signal which corresponds to one of the digits stored in the rows of apertures in said card, said pulse generator pulsing said counter until a predetermined count is reached, whereupon said counting circuit generates an output signal;

a control circuit connected, via an Or-gate, to the outputs of said photoelectric elements and to said pulse generator, for initiating the operation of said pulse generator when at least one of said photoelectric elements is energized;

a first relay circuit connected to, and actuated by, the output of said pulse generator, and having relay contacts for generating said dial pulse;

a second relay circuit connected to, and actuated by, said control circuit and having a first pair of relay contacts for connecting the relay contacts of said first relay circuit into a telephone line connecting said device to a central office; and a monitoring circuit connecting the output of said counting circuit to said control circuit, to terminate operation of said pulse generator and to release the contacts of said second relay circuit when the output signal from said counting circuit is received;

a rotatable shaft driven by the release force of a spring which is compressed by the insertion of a record card into the device;

at least one card-advancing gear coupled to said shaft, and having teeth for engagement with said driving apertures;

an anchor escapement for controlling the speed at which at least one gear rotates, to control the velocity at which said record card is ejected from said device;

an electromagnetic means for controlling the position of the anchor in said anchor escapement to arrest travel of said record card; and a second control circuit connected to said electromagnetic means, to energize said electromagnetic means, said second relay circuit having an additional pair of contacts for enabling said second control circuit whereby the motion of said card is arrested during the interval in which pulses are generated by said pulse generator.

* * * * *